(No Model.)

W. C. & C. R. RANSDEN.
CASTER.

No. 539,543. Patented May 21, 1895.

Witnesses:
Walter E. Lombard
H. Theodore Fletcher

Inventors:
Wallace C. Ransden,
Charles R. Ransden,
by N. C. Lombard
Attorney.

UNITED STATES PATENT OFFICE.

WALLACE C. RANSDEN AND CHARLES R. RANSDEN, OF BROCKTON, MASSACHUSETTS.

CASTER.

SPECIFICATION forming part of Letters Patent No. 539,543, dated May 21, 1895.

Application filed December 29, 1894. Serial No. 533,280. (No model.)

*To all whom it may concern:*

Be it known that we, WALLACE C. RANSDEN and CHARLES R. RANSDEN, of Brockton, in the county of Plymouth and State of Massachusetts, have invented certain new and useful Improvements in Furniture-Casters, of which the following, taken in connection with the accompanying drawings, is a specification.

Our invention relates to furniture casters, is designed especially for use on drying racks in shoe and other factories and it consists in certain novel features of construction, arrangement and combination of parts which will be readily understood by reference to the description of the accompanying drawings and to the claims hereto appended and in which our invention is clearly pointed out.

In many factories where portable drying racks, or other movable receptacles for the manufactured goods or articles in the process of manufacture, mounted upon casters are more or less extensively used, a serious difficulty has been found to exist which to a greater or less extent prevents the proper operation of the casters when constructed in the ordinary way owing to the clogging of the caster truck to such an extent as to prevent its rotation, by bits of yarn, thread, hairs, shavings of wood or leather or other material becoming wound about the axle about which said truck revolves, and wedged between the hub of said truck and the ears of the truck holder in which said axle is mounted. This difficulty is particularly serious in shoe factories where bits of waxed thread are very plentifully scattered about upon the floor and mixed with leather, shavings and other waste material, and where frames or racks heavily loaded with boots or shoes have to be frequently moved from one part of the factory to another. These racks are fitted with casters to facilitate their movement about the factory, but it often happens that the caster truck becomes so clogged with waxed threads and shavings, wound about the axle and wedged into the joint between the hub of the trucks and the ears of the truck carriers, that the trucks will not revolve at all, and soon become worn out or round thus spoiling the casters. To overcome this objection is the object of our invention and to this end we have designed the caster illustrated in the accompanying drawings, in which—

Figure 1:
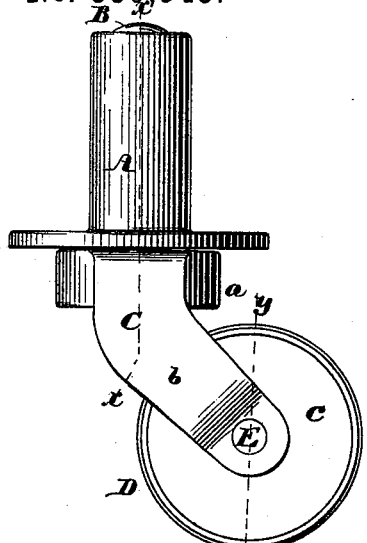
Figure 3:
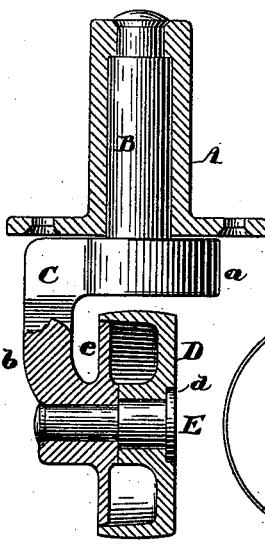
Figure 2:
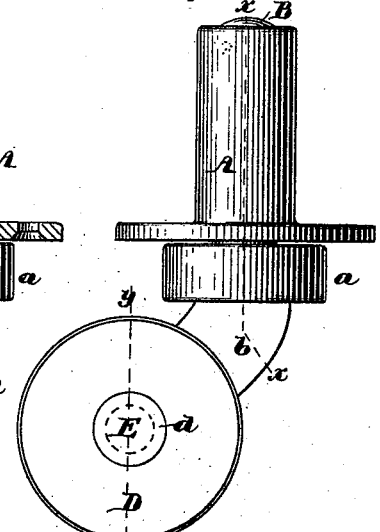
Figure 5:
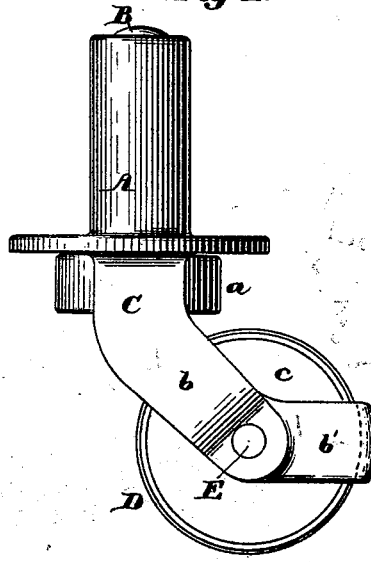
Figure 6:
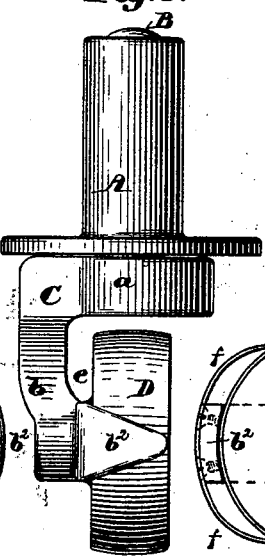
Figure 7:
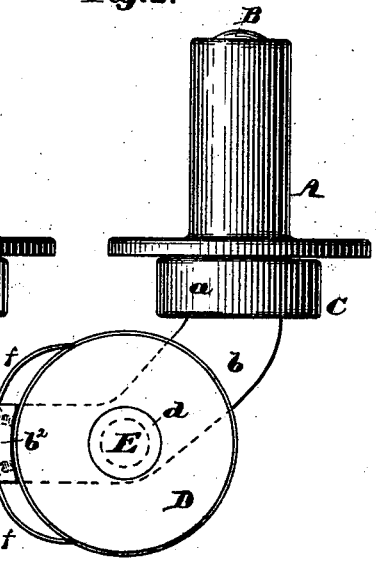
Figure 4:
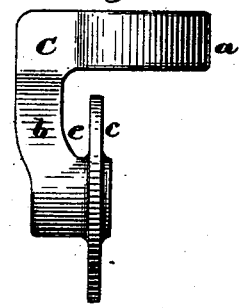

Figure 1 is a side elevation of a caster, illustrating the most simple form of our invention. Fig. 2 is an elevation of the opposite side of the same caster. Fig. 3 is a sectional elevation of the same viewed at right angles to Figs. 1 and 2, the cutting planes being on lines $x\,x$ and $y\,y$ on Figs. 1 and 2. Fig. 4 is an elevation of the pendent truck-support detached from the spindle and socket and with the truck and stud removed. Fig. 5 is a side elevation of a caster provided with a truck-clearer. Fig. 6 is an elevation of the same viewed at right angles to Fig. 5; and Fig. 7 is a side elevation viewed from a direction opposite to that of Fig. 5 and illustrating another form of the truck-clearer.

In the drawings A is the socket to be set in the leg or base of the rack or other article to be supported by the casters in which socket is fitted the spindle B so as to be revoluble therein all in a well known manner.

The spindle B has firmly secured to its lower end, or formed in one piece therewith, the pendent truck carrying stand C, comprising the hub or collar $a$, the pendent obliquely inclined arm $b$, and the collar or flange $c$, as clearly shown in Figs. 1 and 4.

D is the caster truck chambered upon one side to receive the collar or flange $c$ so that the rim of said truck projects over the periphery of said collar or flange as shown in Fig. 3.

E is a stud set in the stand C to form a bearing for the truck D, and is provided on its outer end with the collar or head $d$ which fits into and substantially fills a smaller central recess formed in the outer face of said truck as shown in Fig. 3.

The inclined arm $b$ of the pendent truck supporting stand C is connected to the hub $a$ at one side thereof, and at a sufficient distance from the center of said hub and the axis of the spindle B so that when the truck D is mounted in position with the center of its axial length in the same vertical plane as the axis of the spindle B there shall be a liberal space between the inner edge of the rim of said truck and the inner face of said pendent inclined arm $b$ as shown at $e$ in Figs. 3 and 6 and between said arm and collar or flange $c$ as shown in Figs. 3 and 4.

With a caster constructed as described there is no possibility of the truck becoming clogged and thus rendered inoperative by the waxed threads or other refuse being wound upon the journal upon which the truck revolves. They may be wound around the hub of the arm $b$ between said arm and the collar $c$ but that would not affect the rotation of said truck.

In some cases we provide the lower end of the arm $b$ with the horizontal extension $b'$ the outer end of which is bent at right angles to its main body and extends across, and has its inner face fitted to the curved edge of the truck D, and in such close proximity thereto that any thread or other material which might adhere to said truck would be scraped off thereby, said lateral extension $b^2$ being made V shaped in elevation with the apex of the V extending to the outer face of said truck as shown in Fig. 6.

Instead of the V shaped lateral extension $b^2$ fitting closely to the periphery of the truck we may make said extension with its upper and lower edges parallel and slightly removed from the periphery of said truck and secure thereto a light leaf spring $f$, the free end or ends of which press lightly upon the periphery of said truck as shown in Fig. 7 and act as a doctor plate to remove any foreign substance that may adhere to the periphery of said truck.

The operation of our invention will be readily understood from the foregoing without further explanation here.

What we claim as new, and desire to secure by Letters Patent of the United States, is—

1. In a caster the combination with a supporting socket and a swiveling spindle, of a truck supporting stand provided with a single pendent inclined arm having at its lower end a hub to receive the truck supporting stud and a circular collar or flange concentric with said stud, with a space between said collar and arm; a truck recessed upon one side to receive said collar and upon the other side to receive the head of its supporting stud; and a stud set in said arm and forming a journal for said truck without projecting beyond its outer face.

2. The combination in a caster, of a supporting socket; a swiveling spindle mounted therein; the truck carrying stand or hanger C, comprising a single pendent inclined arm $b$ with a hub at its lower end, the collar $c$ surrounding said hub and removed from the inner face of said arm $b$; a stud set in said hub and provided with a head upon its outer end; the truck D mounted on said stud with its rim projecting over the peripheral edge of said collar; and a doctor plate formed in one piece with said truck supporting arm constructed, arranged and operating to clean the periphery of said truck as it is revolved.

In testimony whereof we have signed our names to this specification, in the presence of two subscribing witnesses, on this 28th day of December, A. D. 1894.

WALLACE C. RANSDEN.
CHARLES R. RANSDEN.

Witnesses:
N. C. LOMBARD,
WALTER E. LOMBARD.